United States Patent
Isobe (10) Patent No.: US 9,679,230 B2
(45) Date of Patent: Jun. 13, 2017

(54) PRINT CONTROL APPARATUS, PRINT CONTROL METHOD, AND NON-TRANSITORY COMPUTER READABLE MEDIUM

(71) Applicant: FUJI XEROX CO., LTD., Tokyo (JP)

(72) Inventor: Kimihiko Isobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/046,912

(22) Filed: Feb. 18, 2016

(65) Prior Publication Data
US 2017/0061262 A1    Mar. 2, 2017

(30) Foreign Application Priority Data

Aug. 25, 2015  (JP) .................. 2015-165589

(51) Int. Cl.
*G06K 15/02* (2006.01)
*G06K 15/10* (2006.01)

(52) U.S. Cl.
CPC ....... *G06K 15/1852* (2013.01); *G06K 15/102* (2013.01); *G06K 15/1857* (2013.01)

(58) Field of Classification Search
None
See application file for complete search history.

(56) References Cited

U.S. PATENT DOCUMENTS

| | | | |
|---|---|---|---|
| 5,943,503 A | 8/1999 | Kai | |
| 6,587,971 B1 | 7/2003 | Kai | |
| 7,120,373 B2 * | 10/2006 | Kushida | G03G 15/5016 399/81 |
| 2002/0140962 A1 | 10/2002 | Oka | |
| 2002/0181003 A1 * | 12/2002 | Kakutani | H04N 1/4052 358/1.13 |

FOREIGN PATENT DOCUMENTS

| | | |
|---|---|---|
| JP | H09-251356 A | 9/1997 |
| JP | H10-97393 A | 4/1998 |
| JP | 2002-297336 A | 10/2002 |

* cited by examiner

*Primary Examiner* — Fan Zhang
(74) *Attorney, Agent, or Firm* — Oliff PLC (57) ABSTRACT

A print control apparatus includes a setting unit. The setting unit selects one or more statuses to be obtained among statuses indicating states of as image output apparatus, in accordance with content displayed on a display that displays the selected statuses. The setting unit sets a polling interval at which polling is performed to obtain the selected statuses, in accordance with a frequency of change of the selected statuses. The setting unit sets the number of parallel processes in accordance with the number of selected statuses.

4 Claims, 6 Drawing Sheets

100a

| CONDITIONS | | THREADS TO BE CREATED | |
|---|---|---|---|
| NUMBER OF REGISTERS | IMMEDIACY | POLLING INTERVAL | NUMBER OF PARALLEL PROCESSES |
| -20 | HIGH | 300 ms | 1 |
| -20 | INTERMEDIATE | 500 ms | 1 |
| -20 | LOW | 800 ms | 1 |
| 20-40 | HIGH | 300 ms | 2 |
| 20-40 | INTERMEDIATE | 500 ms | 2 |
| 20-40 | LOW | 800 ms | 2 |
| 40- | HIGH | 300 ms | 3 |
| 40- | INTERMEDIATE | 500 ms | 3 |
| 40- | LOW | 800 ms | 3 |

| CONDITIONS | | THREADS TO BE CREATED | |
|---|---|---|---|
| NUMBER OF REGISTERS | IMMEDIACY | POLLING INTERVAL | NUMBER OF PARALLEL PROCESSES |
| -20 | HIGH | 300 ms | 1 |
| -20 | INTERMEDIATE | 500 ms | 1 |
| -20 | LOW | 800 ms | 1 |
| 20-40 | HIGH | 300 ms | 2 |
| 20-40 | INTERMEDIATE | 500 ms | 2 |
| 20-40 | LOW | 800 ms | 2 |
| 40- | HIGH | 300 ms | 3 |
| 40- | INTERMEDIATE | 500 ms | 3 |
| 40- | LOW | 800 ms | 3 |

PRINT CONTROL APPARATUS, PRINT CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-165589 filed Aug. 25, 2015.

BACKGROUND

Technical Field

The present invention relates to a print control apparatus, a print control, method, and a non-transitory computer readable medium.

SUMMARY

According to an aspect of the invention, there is provided a print control apparatus including a setting unit. The setting unit selects one or more statuses to be obtained among statuses indicating states of an image output apparatus, in accordance with content displayed on a display that displays the selected statuses. The setting unit sets a polling interval at which polling is performed to obtain the selected statuses, in accordance with a frequency of change of the selected statuses. The setting unit sets the number of parallel processes in accordance with the number of selected statuses.

BRIEF DESCRIPTION OF THE DRAWINGS

An exemplary embodiment of the present invention will be described in detail based on the following figures, wherein.

DETAILED DESCRIPTION

Figure 1:
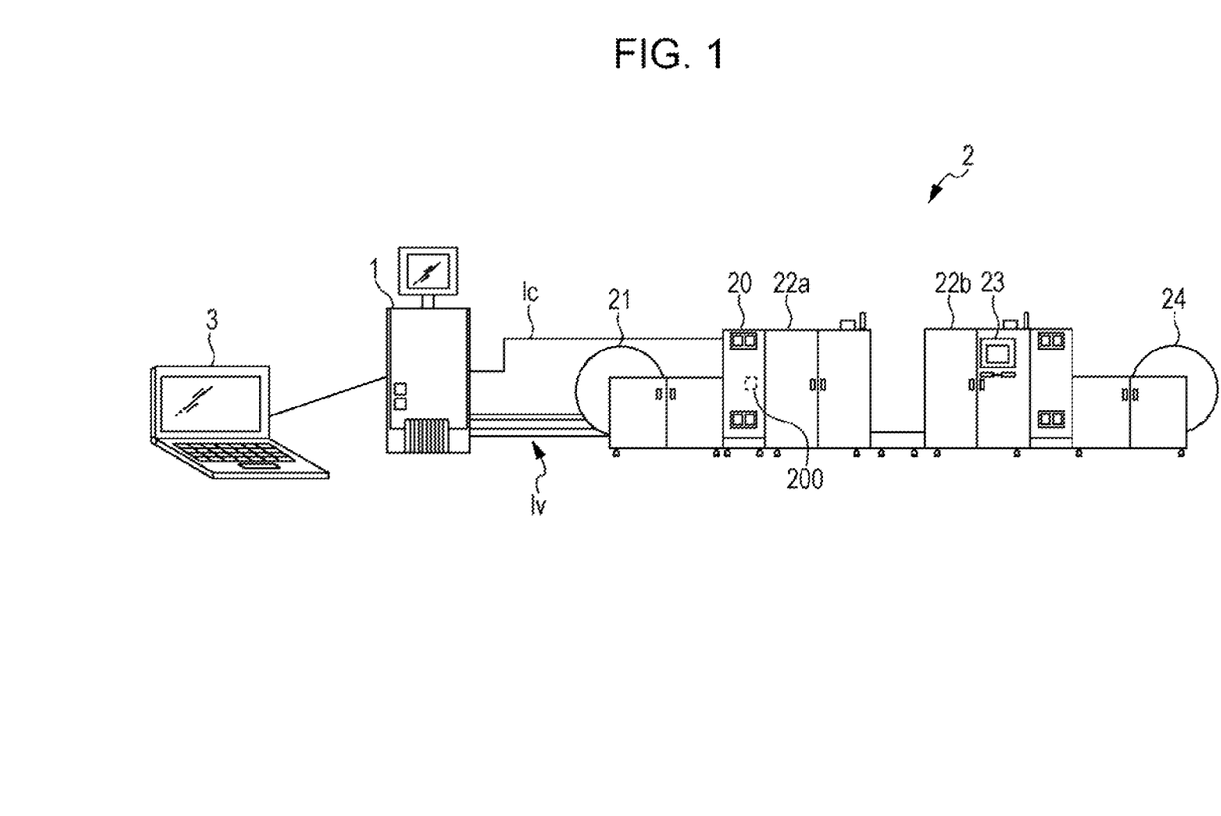
FIG. 1 illustrates an example of a configuration of an image forming apparatus according to an exemplary embodiment of the present invention.

FIG. 1 illustrates an example of a configuration of an image forming apparatus according to an exemplary embodiment of the present invention.

The image forming apparatus is, for example, a digital color printing system. The image forming apparatus includes a print control apparatus 1 and an image output apparatus 2. The print control apparatus 1 performs image processing on image data that is transmitted from a terminal 3, such as a personal computer, located upstream in terms of data processing. The image output apparatus 2 forms a color image on a sheet, which is an example of a recording medium, in accordance with the image data on which the print control apparatus 1 has performed the image processing.

The print control apparatus 1 performs polling via a control signal line 1c to receive information (hereinafter, referred to as "statuses") indicating states of individual units of the image output apparatus 2. The print control apparatus 1 transmits a control signal via the control signal line 1c to control an operation of the image output apparatus 2. The print control apparatus 1 also transmits image data to the image output apparatus 2 via video signal lines 1v. In addition, the print control apparatus 1 transmits a display video signal to an operation panel 23 of the image output apparatus 2 via the control signal line 1c and receives an operation signal from the operation panel 23 via the control signal line 1c.

The image output apparatus 2 is capable of performing variable-data printing, for example. The image output apparatus 2 includes a print control unit 20, a sheet feeding unit 21, image forming units 22a and 22b, the operation panel 23, and a take-up unit 24. The print control unit 20 communicates with the print control apparatus 1 and controls the individual units of the image output apparatus 2. The sheet feeding unit 21 feeds a roiled continuous sheet. The image forming units 22a and 22b form an image on the continuous sheet using an inkjet system and dry inks. The operation panel 23 includes a display unit that displays states of the image forming apparatus and a touchscreen used to operate the image forming apparatus. The take-up unit 24 takes up the continuous sheet having the image formed thereon.

The print control unit 20 includes registers 200, which serve as a memory. The print control unit 20 writes the statuses of the individual units of the image output apparatus 2 to the respective registers 200 at certain intervals. The print control unit 20 also transmits the statuses written to the registers 200 to the print control apparatus 1 when polled by the print control apparatus 1. Note that the registers 200 have plural memory spaces, and that the statuses written to the individual memory spaces are classified in accordance with the frequency of change of the statuses and the polling intervals (described later) of the statuses. Here, the term "frequency of change" refers to an interval at which the status changes. A status for which a status-changing interval is relatively short is referred to as a status having a "high frequency of change", whereas a status for which a status-changing interval is relatively long is referred to as a status having a "low frequency of change".

Figure 2:
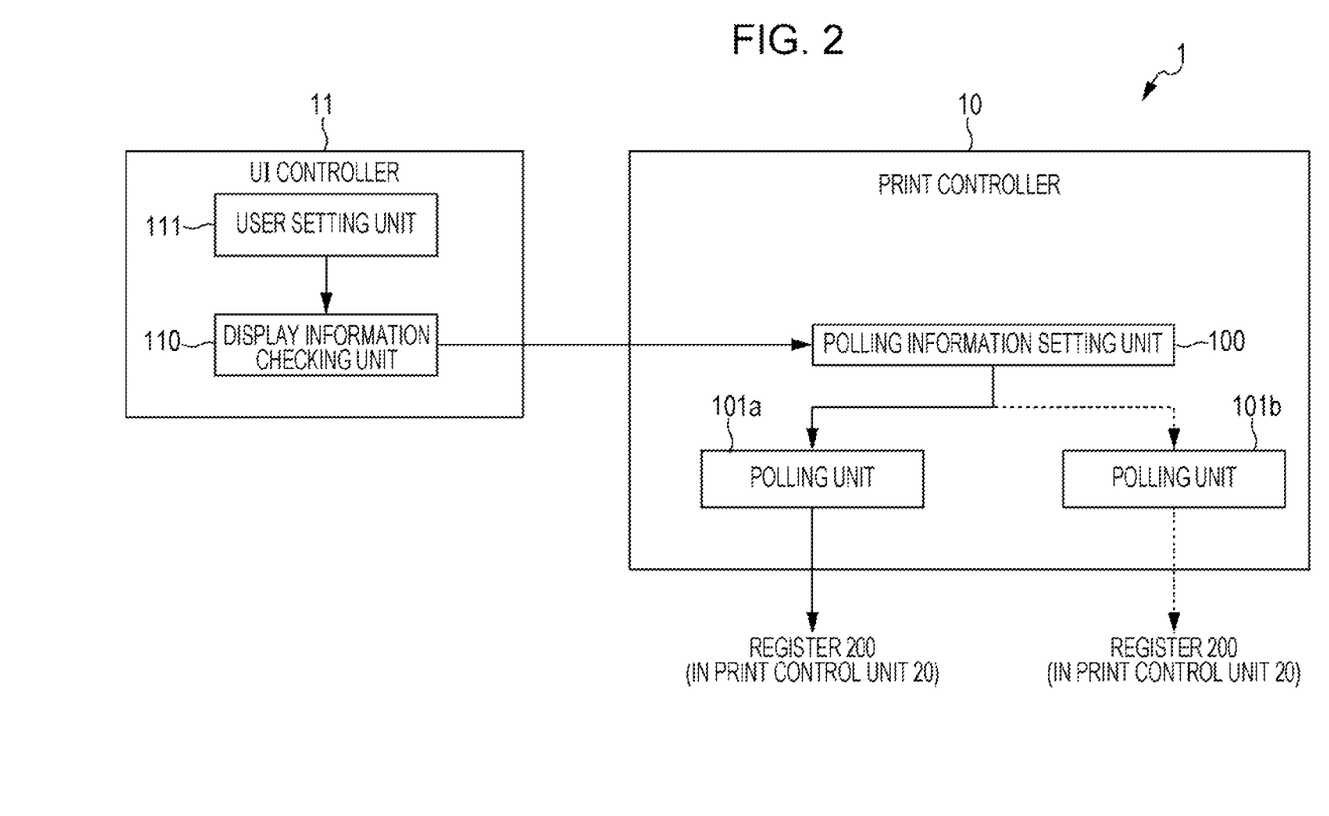
FIG. 2 is a schematic block diagram illustrating an example of a configuration of a print control apparatus.

FIG. 2 is a schematic block diagram illustrating an example of a configuration of the print control apparatus 1.

The print control apparatus 1 includes a control unit such as a central processing unit (CPU), a storage unit such as a flash memory, and a communication unit that communicates with an external apparatus via a network. The control unit functions as a print controller 10 and a UI controller 11. The print controller 10 performs polling via the control signal line 1c to receive the statuses of the image output apparatus 2 and transmits a control signal via the control signal line 1c to control an operation of the image output apparatus 2. The print controller 10 also transmits image data to the image output apparatus 2 via the video signal lines 1v. The UI controller 11 transmits a display video signal to the operation panel 23 of the image output apparatus 2 via the control signal line 1c and receives an operation signal from the operation panel 23 via the control signal line 1c.

In addition to implementing the aforementioned functions, the print controller 10 also functions as, for example, a polling information setting unit 100 and polling units 101a, 101*b*, . . . (hereinafter, collectively referred to as polling units 101 when distinction therebetween is not needed).

Based on predetermined conditions, the polling information setting unit 100 sets information such as the number of pieces of data obtained from the registers 200 of the print control unit 20 of the image output apparatus 2, a polling interval at which the print control unit 20 is polled, and the number of the polling units 101*a*, 101*b*, . . . to be caused to operate. The polling information setting unit 100 sets such information in accordance with information and a polling information reconfiguration request received from the UI controller 11.

The polling units 101*a*, 101*b*, . . . each poll the print control unit 20 of the image output apparatus 2 in accordance with the information set by the polling information setting unit 100.

In addition to implementing the aforementioned functions, the UI controller 11 also functions as, for example, a user setting unit 111 and a display information checking unit 110.

The user setting unit 111 sets an operation state of the image forming apparatus in accordance with content of an operation performed by the user on the operation panel 23. The user setting unit 111 also changes content displayed on the operation panel 23 in accordance with the operation state.

The display information checking unit 110 determines the statuses to be obtained, in accordance with the content displayed on the operation panel 23. The display information checking unit 110 also sends a polling information reconfiguration request to the polling information setting unit 100 along with information indicating the statuses to be obtained.

Figure 3:
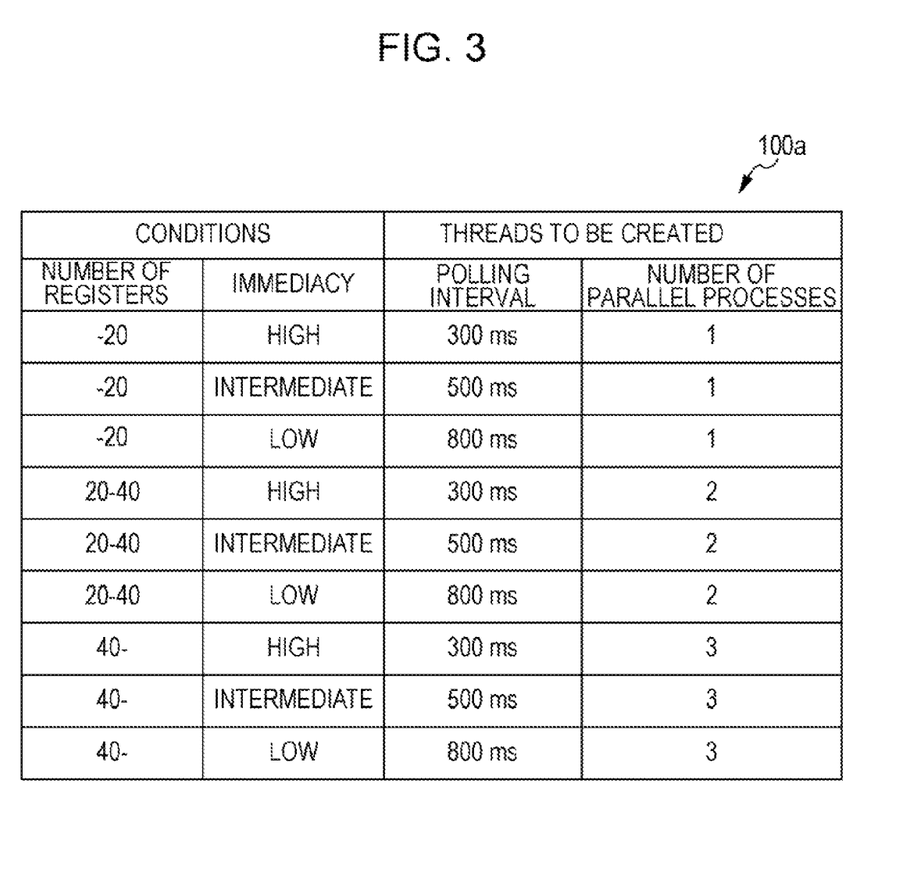
FIG. 3 illustrates an example of conditions referred to by a polling information setting unit.

FIG. 3 illustrates an example of conditions referred to by the polling information setting unit 100.

Condition information 100*a* is, for example, stored in the storage unit of the print control apparatus 1 and referred to by the polling information setting unit 100. The condition information 100*a* includes pieces of information about the number of registers, the immediacy, the polling interval, and the number of parallel processes. The number of registers indicates the number of statuses which the polling units 101 obtain from the registers 200. The immediacy indicates how frequently the status needs to be obtained. The polling interval is determined on the basis of the number of registers and the immediacy. The number of parallel processes indicates the number of polling units 101 used, which is determined on the basis of the number of registers and the immediacy. These pieces of information are predetermined based on the following reasons.

In the case of high immediacy, that is, relatively short status-changing intervals, polling needs to be performed at intervals at least shorter than the status-changing intervals. Accordingly, the polling intervals are set to be shorter than those in the other cases. In addition, as the number of statuses to foe obtained (the number of registers) increases, the processing load of the polling unit 101 increases and the overall processing time taken to obtain the statuses also increases. As a result, it becomes difficult for the polling unit 101 to obtain a certain status at a polling interval that achieves the immediacy required by the status. Accordingly, the polling units 101 are used in parallel to reduce the processing load of the individual polling units 101 and ensure the immediacy.

To use the polling units 101 in parallel, for example, plural threads may be created and be caused to operate as the polling units 101. In the case where the registers 200 are classified on a polling-interval basis, different threads are assigned to registers of different polling intervals. In this way, efficient polling is implemented.

Operations in Exemplary Embodiment

Operations according to the exemplary embodiment will be described separately for an operation performed by the UI controller 11 and an operation performed by the print controller 10.

Operation by UI Controller 11

Figure 5:
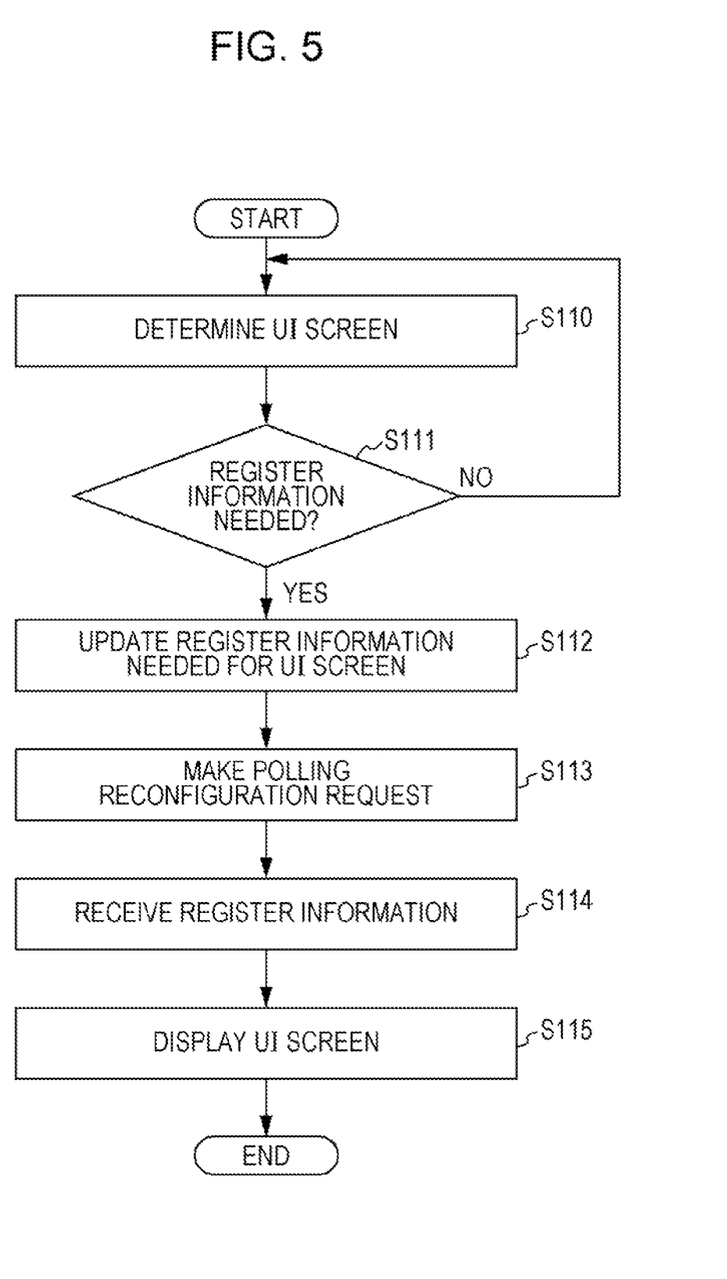
FIG. 5 is a flowchart illustrating an example of an operation performed by a user interface (UI) controller.

FIG. 5 is a flowchart illustrating an example of an operation performed by the UI controller 11.

First, the user setting unit 111 of the UI controller 11 sets the operation state of the image forming apparatus on the basis or content of an operation performed by the user on the operation panel 23.

The user setting unit 111 also changes the content (UI screen) displayed on the operation panel 23 in accordance with the operation state (S110). Specifically, the user setting unit 111 displays content (screen) illustrated in FIG. 4 on the operation panel 23.

Figure 4:
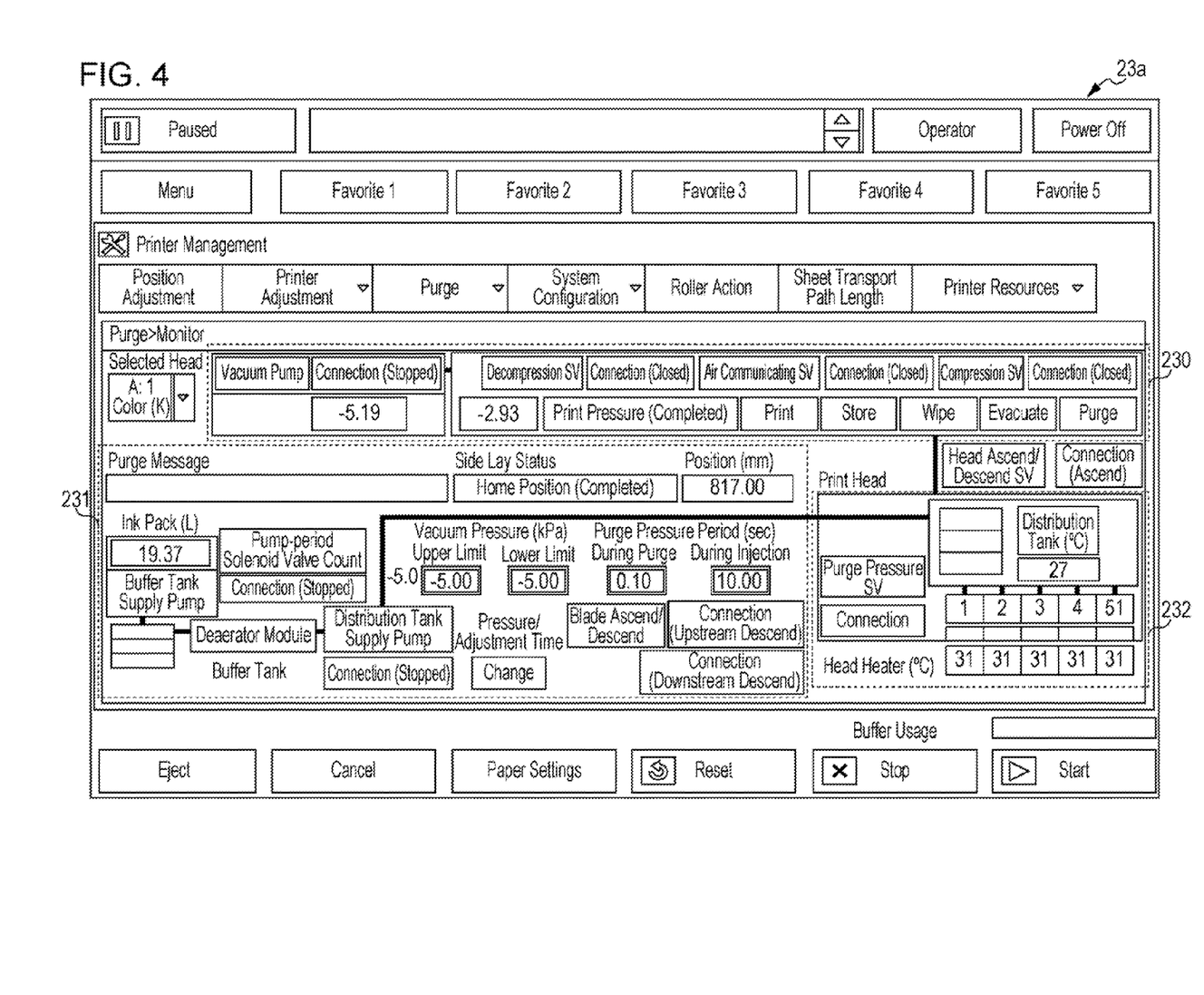
FIG. 4 illustrates an example of a display screen displayed on an operation panel.

FIG. 4 illustrates an example of the screen displayed on the operation panel 23.

A display screen 23*a* is a screen that shows various states of the image output apparatus 2 and includes a main menu used to display other setting screens. The display screen 23*a* includes at display area 230 that shows information regarding pressure sensors included in the image forming units 22*a* and 22*b*, a display area 231 that shows information regarding a side lay, a display area 232 that shows information regarding a distribution tank, and other operation UI components.

Pieces of information such as values and states shown in the display areas 230 and 231 are displayed on the basis of plural statuses (hereinafter, referred to as "register information") obtained from the registers 200 of the print control unit 20.

Based on the display screen 23*a* displayed on the operation panel 23, the display information checking unit 110 then determines whether the statuses need to be obtained, that is, whether the register information is needed (S111). If the register information is needed (YES in S111), the display information checking unit 110 determines the statuses to be obtained and updates the register information needed (S112).

Then, the display information checking unit 110 transmits a polling information reconfiguration request to the polling information setting unit 100 along with the register information (S113).

After receiving from the print controller 10 the register information (S114), which the print controller 10 has received from the print control unit 20 in response to polling, the UI controller 11 displays the values and the states in the display screen 23*a* on the operation panel 23 on the basis of the received register information (S115).

Operation by Print Controller 10

Figure 6:
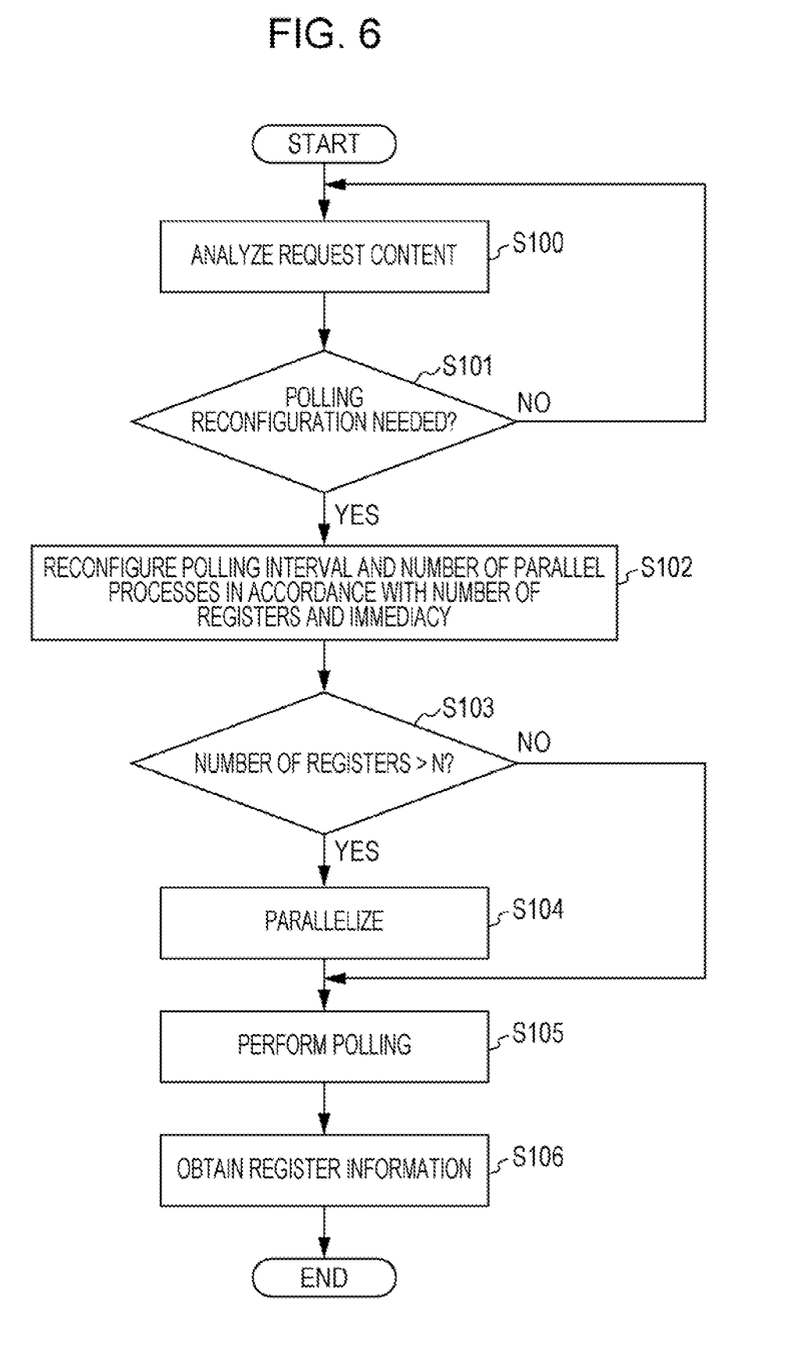
FIG. 6 is a flowchart illustrating an example of an operation performed by a print controller.

FIG. 6 is a flowchart illustrating an example of an operation performed by the print controller 10.

After the print controller 10 accepts a polling information reconfiguration request, the polling information setting unit 100 first analyzes content of the accepted polling information reconfiguration request (S100) and determines whether there is a change in the statuses to be obtained (S101). If there is a change, that is, if reconfiguration of polling is needed (YES in S101), the polling information setting unit 100 reconfigures the polling interval and the number of parallel processes in accordance with the number of registers and the immediacy by referring to the condition information 100a illustrated in FIG. 3 (S102). The polling interval is set to be shorter for statuses with higher immediacy as illustrated in FIG. 3, for example. This is because, in the case where the immediacy is high, that is, the status-changing interval is relatively short, polling needs to be performed at an interval at least shorter than the status-changing interval. In addition, in the case where the number of registers increases, an amount of data to be processed within a certain period also increases. For this reason, the processing load of each polling unit 101 needs to be reduced to allow the polling unit 101 to perform polling at the predetermined polling interval. Thus, the configuration is made such that the larger the number of registers, the larger the number of parallel processes.

Suppose that, in the example illustrated in FIG. 4, the display area 230 includes 50 statuses, such as the compression sensor position, the completion, sensor status, the decompression sensor position, and the decompression sensor status, as the information regarding the pressure sensors and that the immediacy of theses statuses is high. This case meets conditions of the number of registers of "40-" and the immediacy of "high" in FIG. 3. Accordingly, the polling interval and the number of parallel processes are respectively set to "300 ms" and "3".

In addition, suppose that the display area 231 includes 30 statuses, such as the side lay position, the side lay status, the purge message, and the blade state, as the information regarding the side lay and that the immediacy of these statuses is low. This case meets conditions of the number of registers of "20-40" and the immediacy of "low" in FIG. 3. Accordingly, the polling interval and the number of parallel processes are respectively set to "800 ms" and "2".

In addition, suppose that the display area 232 includes 10 statuses, such as the distribution temperature, purge pressure status, the head heater temperature, and the connection/separation state, as the information regarding the distribution tank and that the immediacy of these statuses is intermediate. This case meets conditions of the number of registers of "–20" and the immediacy of "intermediate" in FIG. 3. Accordingly, the polling interval and the number of parallel processes are respectively set to "500 ms" and "1".

Note that the configuration is made such that the larger the number of registers, the larger the number of parallel processes in the example illustrated in FIG. 3; however, the configuration is not limited to this one. For example, in the case where values and states are displayed in the display screen 23a on the operation panel 23 by obtaining statues assigned high immediacy, the display screen 23a needs to be changed certainly. Thus, it is desirable that the number of registers handled by the polling unit 101 implemented by a single thread is reduced. Consequently, the number of parallel processes may be increased for statuses assigned higher immediacy compared to those for statuses assigned lower immediacy in the case where the number of registers is equal.

If the number of registers is larger than a predetermined value, for example, 20 (YES in S103), the polling information setting unit 100 implements parallel processing by causing the polling units 101a, 101b, . . . to operate (S104), the number of which is determined based on the number of registers.

The polling units 101a, 101b, . . . each poll the print control unit 20 of the image output apparatus 2 at the polling interval set by the polling information setting unit 100 (S105).

When accepting an inquiry from the print control apparatus 1 by polling, the print control unit 20 reads the requested statuses from the registers 200 and transmits the statuses to the print control apparatus 1.

The polling units 101a, 101b, . . . each obtain the statuses, that is, the register information (S106).

In accordance with the exemplary embodiment described above, statuses to be obtained are determined in accordance with content displayed on the operation panel 23. The polling interval and the number of parallel processes are set in accordance with the statuses to be obtained.

Note that the present invention is not limited to the exemplary embodiment described above, and various modifications may be made within a scope not departing from the essence of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus for use in an image output apparatus, the image output apparatus containing a plurality of units, each unit being configured to be polled to determine a current status of the unit, the print control apparatus comprising:
 a processor programmed to:
  receive a polling reconfiguration request;
  analyze the received polling reconfiguration request to determine whether the statuses of one or more of the units requires updating;
  upon determination that the statuses of one or more of the units requires updating, determine that a polling reconfiguration is needed;
  determine a number of resisters and a level of immediacy associated with the statuses of the one or more of the units that require updating;
  access stored condition information;
  based on the determined number of registers, the determined level of immediacy, and the stored condition information, set:
   a polling interval at which polling is to be performed to obtain the statuses of one or more of the units; and
   a number of parallel polling processes to be performed to obtain the statuses of one or more of the units;
  poll the one or more of the units having statuses requiring updating based on the set polling interval and set number of parallel polling process to update the statuses of one or more of the units; and
  output the updated statuses for display on a display panel of the image output apparatus.

2. The print control apparatus according to claim 1, wherein the processor is programmed to set the number of parallel processes such that the higher the frequency of change of the selected statuses, the larger the number of parallel processes.

3. A print control method for controlling an image output apparatus, the image output apparatus containing a plurality of units, each unit being configured to be polled to determine a current status of the unit, the method comprising:
- receiving a polling reconfiguration request;
- analyzing the received polling reconfiguration request to determine whether the statuses of one or more of the units requires updating;
- upon determination that the statuses of one or more of the units requires updating, determining that a polling reconfiguration is needed;
- determining a number of registers and a level of immediacy associated with the statuses of the one or more of the units that require updating;
- accessing stored condition information;
- based on the determined number of registers, the determined level of immediacy, and the stored condition information, setting:
  - a polling interval at which polling is to be performed to obtain the statuses of one or more of the units; and
  - a number of parallel polling processes to be performed to obtain the statuses of one or more of the units;
- polling the one or more of the units having statuses requiring updating based on the set polling interval and set number of parallel polling process to update the statuses of one or more of the units; and
- outputting the updated statuses for display on a display panel of the image output apparatus.

4. A non-transitory computer readable medium storing a program causing a computer to execute a process for controlling an image output apparatus, the image output apparatus containing a plurality of units, each unit being configured to be polled to determine a current status of the unit, the process comprising:
- receiving a polling reconfiguration request;
- analyzing the received polling reconfiguration request to determine whether the statuses of one or more of the units requires updating;
- upon determination that the statuses of one or more of the units requires updating, determining that a polling reconfiguration is needed;
- determining a number of registers and a level of immediacy associated with the statuses of the one or more of the units that require updating;
- accessing stored condition information;
- based on the determined number of registers, the determined level of immediacy, and the stored condition information, setting:
  - a polling interval at which polling is to be performed to obtain the statuses of one or more of the units; and
  - a number of parallel polling processes to be performed to obtain the statuses of one or more of the units;
- polling the one or more of the units having statuses requiring updating based on the set polling interval and set number of parallel polling process to update the statuses of one or more of the units; and
- outputting the updated statuses for display on a display panel of the image output apparatus.

* * * * *